(12) United States Patent
Kramer et al.

(10) Patent No.: US 9,316,174 B2
(45) Date of Patent: Apr. 19, 2016

(54) LINER HANGER WITH SPHERICAL WASHERS

(75) Inventors: George J. Kramer, Tolland, CT (US); Jeffrey S. Smith, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 898 days.

(21) Appl. No.: 13/487,596

(22) Filed: Jun. 4, 2012

(65) Prior Publication Data

US 2013/0318979 A1    Dec. 5, 2013

(51) Int. Cl.
*F02K 1/80* (2006.01)
*F02K 1/82* (2006.01)

(52) U.S. Cl.
CPC ............. *F02K 1/82* (2013.01); *F05D 2230/642* (2013.01); *F05D 2260/30* (2013.01); *Y10T 29/49398* (2015.01)

(58) Field of Classification Search
CPC ............. F02K 1/80; F02K 1/82; F02K 1/822; F23R 3/60; F16B 5/06; F16B 5/0607; F16B 5/0621; F16B 5/0628
USPC .......................................... 60/796, 800, 770
See application file for complete search history.

(56) References Cited

U.S. PATENT DOCUMENTS

| | | | |
|---|---|---|---|
| 3,826,088 A | | 7/1974 | Nash et al. |
| 3,890,758 A * | | 6/1975 | Bouchard ........................ 52/713 |
| 4,864,818 A | | 9/1989 | Taylor |
| 4,971,498 A * | | 11/1990 | Goforthe ........................ 411/134 |
| 5,059,055 A | | 10/1991 | DeGress et al. |
| 5,417,056 A | | 5/1995 | Johnson et al. |
| 5,697,213 A * | | 12/1997 | Brewer et al. .................... 60/766 |
| 6,041,590 A * | | 3/2000 | Hayton .................... F02K 1/822 60/766 |
| 7,017,334 B2 | | 3/2006 | Mayer et al. |
| 7,089,748 B2 | | 8/2006 | Tiemann |
| 7,581,399 B2 | | 9/2009 | Farah et al. |
| 7,861,535 B2 | | 1/2011 | Figueroa et al. |
| 7,975,488 B2 | | 7/2011 | Farah et al. |
| 2001/0035003 A1 * | | 11/2001 | Sinha et al. .................. 60/39.31 |
| 2007/0158527 A1 | | 7/2007 | Farah et al. |
| 2008/0022689 A1 | | 1/2008 | Farah et al. |
| 2009/0077978 A1 | | 3/2009 | Figueroa et al. |
| 2009/0230213 A1 | | 9/2009 | Harris |

(Continued)

OTHER PUBLICATIONS

International Search Report and Written Opinion for International Application No. PCT/US2013/042801 mailed on Mar. 13, 2014.

(Continued)

*Primary Examiner* — William H Rodriguez
*Assistant Examiner* — Thomas Burke
(74) *Attorney, Agent, or Firm* — Carlson, Gaskey & Olds, P.C.

(57) ABSTRACT

A liner assembly for a gas turbine engine includes a liner defining an inner surface exposed to exhaust gases and a duct spaced radially outward of the liner. A hanger assembly supports the liner relative to the duct. The hanger assembly includes a body segment attached to the liner and first and second washers defining a gap therebetween that receives a portion of the body segment. The gap between the washers and the body segment provides for relative movement caused by differences in thermal growth within the liner. An attachment member extending between the body section and the duct includes spherical ends that are seated on the first and second washers to accommodate misalignments during assembly.

8 Claims, 2 Drawing Sheets

(56) References Cited

U.S. PATENT DOCUMENTS

| | | | |
|---|---|---|---|
| 2009/0293498 A1* | 12/2009 | Petty | F01D 25/28 60/796 |
| 2010/0115965 A1 | 5/2010 | Farah et al. | |
| 2011/0123323 A1* | 5/2011 | Sanchez et al. | 415/200 |
| 2014/0047849 A1* | 2/2014 | Kramer | F02K 1/80 60/796 |
| 2014/0048166 A1* | 2/2014 | Kramer | F02K 1/822 138/149 |
| 2014/0147266 A1* | 5/2014 | Kramer | F02K 1/822 415/213.1 |
| 2014/0227093 A1* | 8/2014 | Barry | F01D 25/28 415/213.1 |
| 2015/0071704 A1* | 3/2015 | Senofonte | F02K 1/80 403/299 |

OTHER PUBLICATIONS

International Preliminary Report on Patentability for PCT Application No. PCT/US2013/042801, mailed Dec. 18, 2014.

* cited by examiner

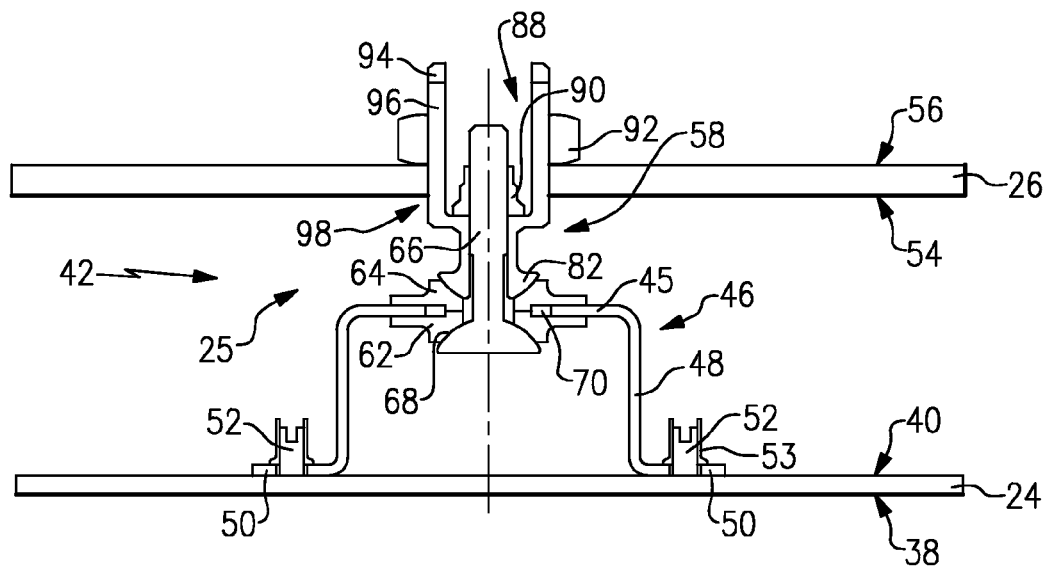
FIG.3
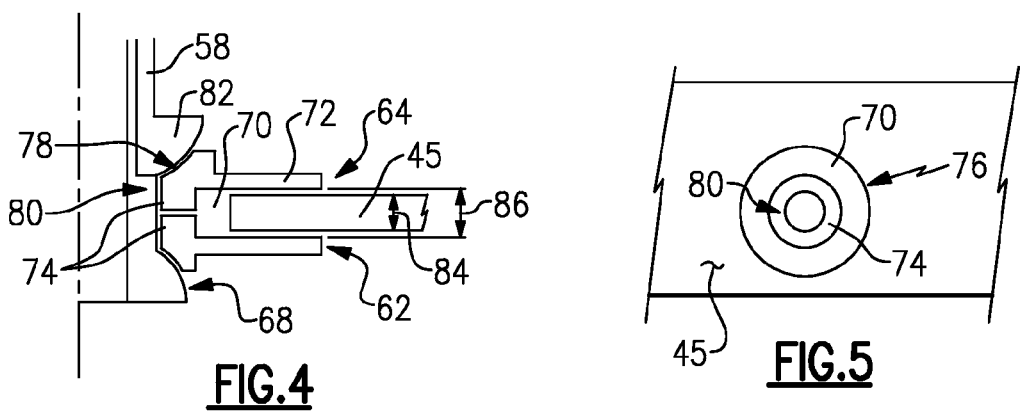
FIG.4
FIG.5
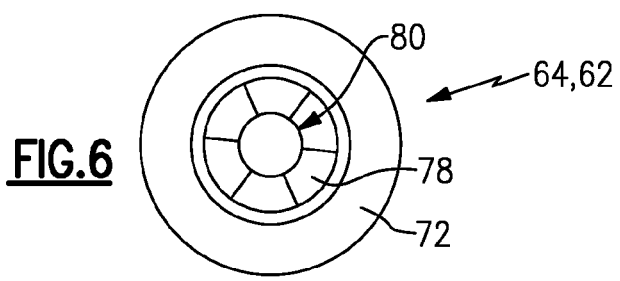
FIG.6

LINER HANGER WITH SPHERICAL WASHERS

BACKGROUND

A gas turbine engine typically includes a fan section, a compressor section, a combustor section, a turbine section, and in some configurations an augmenter section. An exhaust liner assembly extends aft of the turbine and augmenter sections and includes an inner liner exposed to hot exhaust gases. The inner liner is typically spaced from an outer structure with a plurality of hanger assemblies. The hanger assemblies accommodate misalignment, complex shapes, large thermal growth and differentials, significant pressure loads and high temperatures. Moreover, the hangers are positioned within a confined physical envelope that is difficult to access while accommodating relative movement within several planes simultaneously.

Accordingly, it is desirable to design and develop a reduced cost hanger that performs as desired in the harsh environment of the exhaust duct while also simplifying assembly and reducing cost.

SUMMARY

A liner assembly for a gas turbine engine according to an exemplary embodiment of this disclosure, among other possible things includes a liner defining an inner surface exposed to exhaust gases, a duct spaced radially outward of the liner, and a hanger assembly supporting the liner relative to the duct, the hanger assembly including a body segment attached to the liner, first and second washers defining a gap therebetween that receives a portion of the body segment such that the body segment is movable relative to the first and second washers, and an attachment member seated on the first and second washers and attached to the duct.

An embodiment of the foregoing liner assembly, wherein each of the first and second washers includes a boss portion received within the opening of the body segment and a flange extending radially outward from the boss, the gap defined between flanges of the first and second washers.

An embodiment of any of the foregoing liner assemblies, wherein the attachment member comprises a rod including a first end seated on a first seat defined by the first washer and a plug including a second end seated on a second seat defined by the second washer.

An embodiment of any of the foregoing liner assemblies, wherein the plug includes a housing extending through an opening in the duct, a bore extending through the second end into an inner cavity, wherein an end of the rod extends through the bore and is secured within the inner cavity.

An embodiment of any of the foregoing liner assemblies, wherein the plug includes an outer surface engageable by and fastening member for securing the plug to the duct.

An embodiment of any of the foregoing liner assemblies, wherein the rod includes a first spherical end and the plug includes a second spherical end and the first and second seats include a shape corresponding to the first and second spherical ends.

An embodiment of any of the foregoing liner assemblies, wherein the first and second washers are secured together within the opening of the body segment between the first and second spherical ends.

An embodiment of any of the foregoing liner assemblies, wherein the body segment includes legs that extend outward for attachment to the liner.

A hanger assembly according to an exemplary embodiment of this disclosure, among other possible things includes a body segment attachable to a liner, the body segment including an opening, first and second washers defining a gap for receiving a portion of the body segment, and an attachment member seated on one of the first and second washers and attachable to a support spaced apart from the liner.

An embodiment of the foregoing hanger assembly, wherein each of the first and second washers includes a boss portion received within the opening of the body segment and a flange extending radially outward from the boss, the gap defined between flanges of the first and second washers.

An embodiment of any of the foregoing hanger assemblies, wherein the first washer includes a first seat and the second washer includes a second seat and the attachment member comprises a rod seated on the first seat and a plug seated on the second seat.

An embodiment of any of the foregoing hanger assemblies, wherein the rod is securable within the plug and the plug is attachable to the support.

An embodiment of any of the foregoing hanger assemblies, including a first fastening member securing the rod within the plug and a second fastening member engaged to an outer surface of the plug for attaching the plug to the support.

An embodiment of any of the foregoing hanger assemblies, wherein the rod includes a first spherical end and the plug includes a second spherical end and the first and second seats include a shape corresponding to the first and second spherical ends.

An embodiment of any of the foregoing hanger assemblies, wherein the first and second washers are secured together within the opening of the body segment between the first and second spherical ends.

A method of assembling an exhaust liner according to an exemplary embodiment of this disclosure, among other possible things includes attaching a body segment to a surface of an exhaust liner, assembling first and second washers to the body segment to define a gap within which is received a portion of the body segment, inserting a rod through the first and second washers, attaching the rod to a plug, and securing the plug to a support member.

An embodiment of the foregoing method, including the step of holding the first and second washers onto the body segment between a first spherical end of the rod and a second spherical end of the plug.

An embodiment of any of the foregoing methods, including the step of securing the rod within the plug with a self-locking fastening member and securing the plug to the support member with a fastening member engaged to an outer surface of the plug.

These and other features disclosed herein can be best understood from the following specification and drawings, the following of which is a brief description.

BRIEF DESCRIPTION OF THE DRAWINGS

FIG. 3 is a cross section of an example hanger assembly.

FIG. 4 is an enlarged cross section of a portion of the example hanger assembly.

FIG. 5 is a top view a portion of the example washers positioned within an opening of the example hanger assembly.

FIG. 6 is a top view of an example washer of the disclosed hanger assembly.

DETAILED DESCRIPTION

Figure 1:
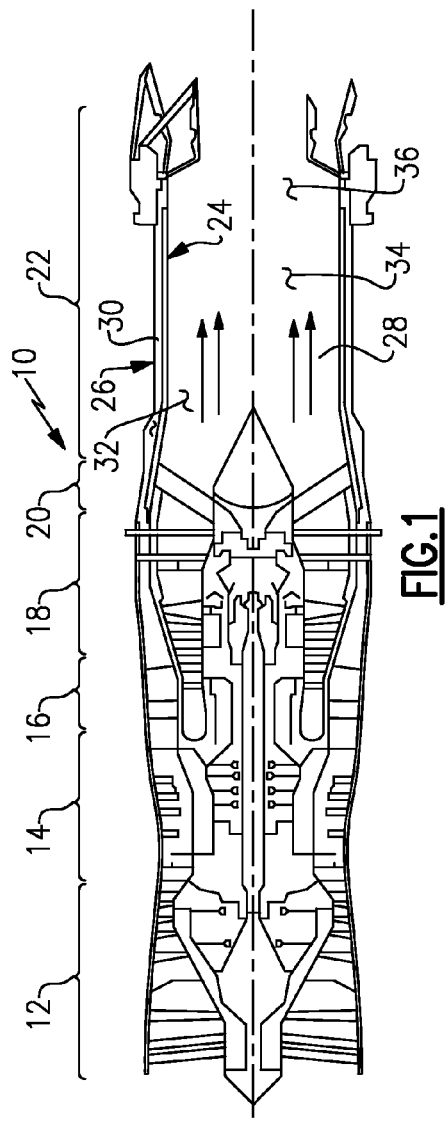
FIG. 1 is a schematic view of an example gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

The example exhaust liner assembly 22 includes a liner 24 that defines an inner surface exposed to the hot exhaust gasses 28. The liner 24 is supported by a duct 26 disposed radially outward of the liner 24. An annular space 30 is disposed between the liner 24 and the duct 26 for a cooling airflow. The example exhaust liner assembly 22 includes a first section 32, a second section 34, and third section 36. Each of the first, second and third sections 32, 34, 36 are movable relative to each other to provide a thrust vectoring function. As appreciated, although the gas turbine engine 10 is disclosed and described by way of example and other configurations and architectures of gas turbine engines are within the contemplation of this disclosure and would benefit from the disclosures within this application.

Figure 2:
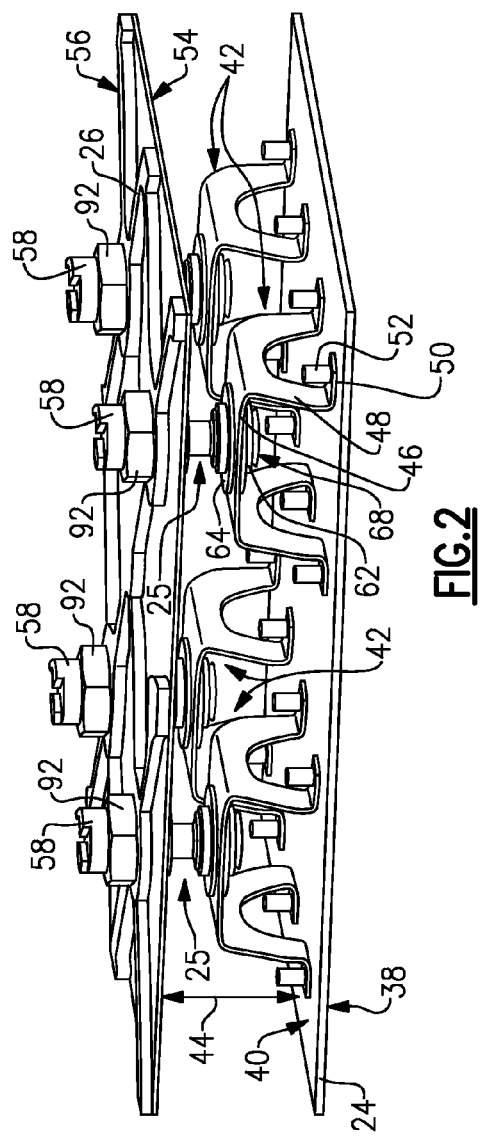
FIG. 2 is a perspective view of a portion of the example exhaust liner assembly including a plurality of example hangers.

Referring to FIG. 2 with continued reference to FIG. 1, the hot exhaust gasses 28 create a high temperature environment within the exhaust liner assembly 22. Accordingly, a cooling air flow is provided in the annular space 30 to define between the liner 24 and the duct 26. This annular space 30 is defined by a plurality of hangers 42. The hangers 42 create and maintain the desired radial distance 44 between the liner 24 and the duct 26 while also compensating for relative thermal growth between the liner 24 exposed to hot exhaust gasses and the duct 26 that is disposed in a relatively cooler environment and therefore does not expand and contract in a fashion similar to that of the liner 24.

The example liner 24 includes a hot side 38 that is exposed to the hot exhaust gasses 28 and a cold side 40 that is facing radially outward within the annular space 30. The duct 26 is spaced the radial distance 44 from the liner 24 and includes an inner side 54 that faces radially inward and an outer side 56 facing radially outward. A plurality of the example hangers 42 are provided at radial and axial intervals within the exhaust liner assembly 22 to hold the liner 24 relative to the duct 26.

Each of the example hanger assemblies 42 includes a body section 46 with legs 48 that extend radially downward to the surface 40 of the liner 24. The legs 48 include tabs 50 that have openings that accept attachment studs 52 that are disposed on the liner 24. A first end of an attachment assembly 25 is attached to the body section 46. A second end of the attachment assembly 25 extends upward from the body section and is attached to the duct 26.

Referring to FIG. 3 with continued reference to FIG. 2, the example hanger assembly 42 includes the body section 46 that includes the legs 48 that extend and come into contact with the surface 40 of the liner 24. The legs 48 include the tabs 50 that include openings that receive an attachment stud 52. A collar 53 is inserted over the attachment stud 52 to secure the body section 46 to the liner 24.

The example body section 46 is comprised of a thin sheet metal material having a thickness determined to provide the desired relative thermal expansion to compensate for the differences in thermal growth between the liner and ducts 26. The body section 46 further includes an opening 76 that receives first and second washers 62, 64.

Referring to FIG. 4 with continued reference to FIG. 3, the example washers 62 and 64 include a flange portion 72 that extends outwardly from a boss 74. The boss 74 is disposed within the opening 80 defined by the body section 46. The boss 74 includes an outer diameter that is less than an outer diameter of the opening 76 within the body section 46.

Each of the washers 62, 64 includes boss 74 that is of a diameter less than an outer diameter of the opening 76 of the body section 46. The differences in diameters between the boss 74 of the first and second washer 62, 64 provides a gap 70 between the opening 76 and the boss 74. The gap 70 is defined to provide for relative movement caused by differential thermal growth between the various components of the exhaust liner assembly. Moreover, the gap 70 accommodates manufacturing and build tolerances.

The boss 74 further includes a shoulder that defines a height that contacts the boss 74 of the other washer to define a space having a radial height 86 that is greater than a thickness 84 of the body section 46. This difference in radial heights creates a spacing or gap between the first and second abutted washers 62, 64 disposed within the opening 76 of the body section 46 such that relative movement between the first and second washers 62 and 64 is facilitated.

Each of the example first and second washers 62, 64 includes a spherical seat 78. In this example, the spherical seat 78 is disposed on an inner radial surface of each of the washers 62, 64 and corresponds to an end of the attachment assembly 25. The example washers 62, 64 are disposed within the opening 76 of the body section 46 and are secured there between first and second spherical ends 68 and 82.

The attachment assembly 25 includes a rod 66, a plug 58 and fastening members 90 and 92. The spherical end 68 is disposed on the rod 66. The spherical end 68 of the rod 66 engages the first washer 62 that is disposed on a bottom surface of the body section 46. The second spherical end 82 is disposed on the plug 58 and is engaged on the second washer 64 that is positioned on a top 45 of the body section 46.

The rod 66 extends upward through openings 80 in the first and second washers 62, 64 into the plug 58. The example plug 58 includes a cavity 88 that is defined within a housing 96. The housing 96 defines the inner cavity 88 within which an end of the rod 66 extends. The rod 66 is secured within the cavity 88 by the threaded fastener 90. The plug 58 is in turn inserted through an opening 98 within the duct 26 such that the housing 96 extends through the duct 26 and is secured to the duct 26 by the fastener 92. The fastener 92 engages external threads defined on an outer surface of the housing 96.

The example hanger assembly 42 is installed within the exhaust liner assembly 22 by first mounting the body section 46 to the liner 24. Mounting in this example is provided by extending a stud 52 already attached to the liner 24 through openings within tabs 50 of the body section 46. A collar 53 is secured to the stud 52 to secure the body section 46 in place.

The tabs 50 extend outwardly from legs 48 that are in turn attached to the top 45. Once the body section 46 is mounted to the liner 24 the first and second washer 62 and 64 are inserted into the opening 76. The example washers 62, 64 are identical parts to simplify assembly. The first washer 62 is assembled with the seat 78 facing downwardly toward the liner 24 and the second washer 64 is assembled with the seat 78 facing upwardly toward the duct 26.

Once the first and second washer 62, 64 are assembled to the opening 76, the rod 66 is inserted through openings in both of the washers 62 and 64 such that the first spherical end 68 engages the seat 78 of the first washer 62. The rod 66 extends outwardly through the washers 62, 64.

The liner 24 is then brought into proximity with the duct 26. The plug 58 is inserted through the duct 26 to contact spherical seat 78 such that the rod 66 is received within the inner cavity 88. Threading engagement between the plug 58 and the duct 26 further accommodates manufacturing and build radial tolerances between the duct 26 and the liner 24. The plug 58 is threaded through the duct 26 and the installation of the fastener 92 locks the housing 96 to allow the fastener 90 to be tightened without causing movement of the plug 58. The fastener 90 is then tightened to secure the plug 58 and the rod 66. The rod 66 includes an anti-rotation hex socket at the tip to prevent rotation when applying torque to fastener 90. The fastener secured the rod 66 in a position to trap the first and second washer 62 and 64 between the corresponding first and second spherical ends 68 and 82.

The washers 62, 64 includes a spacing that ensures that the gap 70 provides not only a radial clearance with the opening 76, but also a clearance with the top 45 of the body section 46 to allow lateral movement of the plug 58 and rod 66. The washers 62, 64 further traps the body section 46 to permit the transfer of radial, tensile and compressive loads into the ball end of the rod 66 and the plug 58. The housing 96 includes a notch 94 that provides an anti-rotation function to hold the housing 96 when fastening the fastener 92. The fastening member 92 is tightened to a desired torque and to provide the desired spacing between the liner 24 and duct 26.

The example hanger 42 provides for the relative expansion between the liner 24 and duct 26 through the materials selected for the body section 46 and the thicknesses provided for the legs 48 and top 45. Furthermore, relative movement in an axial or radial direction is accommodated by the clearance between the bosses 74, the first and second washer 62, 64, and the opening 76 within the body section 46. The spherical interfaces between the seats 78 of the washer 62 and 64 and the first seat 68 of the rod 66 and spherical end 82 of the plug 58 accommodate assembly misalignments such that once the rod 68 is tightened by way of fastener 90 the corresponding radial surfaces and corresponding spherical surfaces align the washers 62 and 64 within the opening 76 of the body section 46.

Accordingly, the example holder assembly provides simplified assembly while accommodating misalignment and relative thermal growth between the liner 24 and duct 26.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A liner assembly for a gas turbine engine comprising:
a liner defining an inner surface exposed to exhaust gases from the gas turbine engine;
a duct spaced radially outward of the liner; and
a hanger assembly supporting the liner relative to the duct, the hanger assembly including a body segment attached to the liner, a first washer disposed within an opening of the body segment, and a second washer disposed within the opening of the body segment, a portion of the first washer in abutting contact with a portion of the second washer within the opening of the body segment, the first washer and the second washer defining a gap therebetween, wherein the gap between the first washer and the second washer receives a portion of the body segment such that the body segment is movable relative to the first washer and the second washer, and an attachment member is seated on the first washer and the second washer and attached to the duct.

2. The liner assembly as recited in claim 1, wherein each of the first washer and the second washer include a boss portion received within the opening of the body segment and a flange extending radially outward from the boss, the gap defined between flanges of the first and second washers.

3. The liner assembly as recited in claim 1, wherein the attachment member comprises a rod including a first end seated on a first seat defined by the first washer and a plug including a second end seated on a second seat defined by the second washer.

4. The liner assembly as recited in claim 3, wherein the plug includes a housing extending through an opening in the duct, a bore extending through the second end into an inner cavity, wherein an end of the rod extends through the bore and is secured within the inner cavity.

5. The liner assembly as recited in claim 4, wherein the plug includes an outer surface engageable by a fastening member for securing the plug to the duct.

6. The liner assembly as recited in claim 4, wherein the rod includes a first spherical end and the plug includes a second spherical end and the first and second seats include a shape corresponding to the first and second spherical ends.

7. The liner assembly as recited in claim 6, wherein the first and second washers are secured together within the opening of the body segment between the first and second spherical ends.

8. The liner assembly as recited in claim 1, wherein the body segment includes legs that extend outward for attachment to the liner.

* * * * *